United States Patent Office 3,547,669
Patented Dec. 15, 1970

3,547,669
STABLE LIQUID COMPOSITIONS OF MATTER
Orlando A. Battista, Yardley, Pa., assignor to FMC Corporation, Philadelphia, Pa., a corporation of Delaware
No Drawing. Continuation-in-part of application Ser. No. 436,304, Mar. 1, 1965. This application Apr. 18, 1966, Ser. No. 543,017
The portion of the term of the patent subsequent to July 29, 1986, has been disclaimed
Int. Cl. C08f *45/52;* C08g *51/10;* C08k *1/14*
U.S. Cl. 106—272         12 Claims

ABSTRACT OF THE DISCLOSURE

Viscosity stable compositions comprising a major proportion of a liquid medium that includes a non-aqueous constituent and a minor proportion of a disintegrated, chemically modified chrysotile colloidally dispersed in the liquid medium, at least 10% by weight of the disintegrated modified chysotile having a particle size of less than one micron. The chemically modified chysotile has a $SiO_2$ to MgO weight ratio of 5% to 30% greater than that of the parent chrysotile.

---

This invention relates to stable liquid compositions of matter and it is a continuation-in-part of my copending application Ser. No. 436,304, filed Mar. 1, 1965. More particularly, it relates to coatings, cleaning, treating and other liquid compositions which have improved properties.

In many industrial fields it is necessary to stabilize, disperse, gelatinize, thicken, control flow of, or impart thixotropic characteristics to liquid compositions such as paints, unsaturated polyester resins, plastisols, silicone elastomers, lacquers, inks, adhesives, latices, paint removers, putties, lubricating, oils, filter coatings, metal cleaners, wood bleach, detergents, wax emulsions, emulsion polymerization mixes and the like.

An agent which is incorporated in a liquid composition to accomplish the above objectives should be effective at relatively low concentrations and for a reasonable length of time. It should provide a composition having properties or characteristics which are not undesirably affected by temperature change, or acid or basic conditions. The agent should be inexpensive and substantially inert whereby it will not adversely affect other properties of the liquid composition.

It is an object of this invention to provide a liquid composition containing a non-aqueous ingredient and having improved stability.

It is another object of this invention to provide a thickened liquid composition having improved viscosity-temperature characteristics.

It is still another object of this invention to provide a liquid composition containing a non-aqueous ingredient and having improved thixotropic and flow characteristics.

It is still another object of this invention to provide a liquid composition which is stable to acid or basic conditions.

These and other objects are accomplished in accordance with this invention by forming a composition which comprises a major proportion of a liquid medium that includes a non-aqueous constituent and a minor proportion, but not less than about 0.1%, based on the weight of the liquid medium, of a disintegrated, chemically modified chrysotile in which the ratio of $SiO_2$ to MgO is between 1.05 to 1.0 and 1.30 to 1.0 by weight, at least 10% by weight of said modified chrysotile being of sub-micron particle size in all dimensions. While the amount of modified chrysotile in the composition will generally vary from about 0.1 up to about 40% and more, for many applications a range of from about 0.1 to about 10.0% is preferred. The generally accepted formula for chrysotile is $3MgO \cdot 2SiO_2 \cdot 2H_2O$. Thus, in chrysotile, the weight ratio of $SiO_2$ to MgO is approximately 1:1 and, based upon this formula and the above stated weight ratio of the chemically modified chrysotile, it is apparent that the weight ratio of $SiO_2$ to MgO has been increased by from 5% to 30% over the corresponding ratio of the parent chrysotile.

The chemically modified chrysotile material is a unique microcrystalline colloidal silicate material and is the subject of my copending applications, Ser. No. 436,304, filed Mar. 1, 1965, now abandoned, and Ser. No. 479,620, filed Aug. 13, 1965. These applications teach that relatively long fibered asbestos is advantageously chemically modified and then mechanically disintegrated to obtain the desired product. In the chemical treatment, the materials which produce the desirable change in chemical composition consist essentially of any acid or acid salt. The acid may be weak or strong and the treatment may be at any desired temperature. However, best results are obtained by treatment at elevated temperatures, preferably the reflux temperature of the particular treating agent involved, in aqueous suspension at rather low solid content. For example, 0.2 N hydrochloric acid can be used to treat chrysotile at about 5% solids for ½ to 4 hours at reflux. This treatment will produce an optimum change in the $SiO_2/MgO$ ratio to about 1.21 to 1.0; or an increase in the $SiO_2/MgO$ ratio of about 21% as compared to the corresponding ratio of the present chrysotile. The use of a pressure digester to permit digestion under pressure permits a reduction in the time of treatment to affect a change to the optimum $SiO_2/MgO$ ratio.

In the initial treatment, satisfactory results have been obtained with hydrochloric acid, sulfuric acid, nitric acid, an acetylating mixture consisting of acetic acid, acetic anhydride, and trace amounts of sulfuric acid, and phosphoric acid. It is important that the acid be not too concentrated. For example, 0.4 normal sulfuric acid at reflux will remove far too much magnesium oxide in five minutes, causing an excessive change in the $SiO_2/MgO$ ratio, together with a rapid loss of yield. On the other hand, an acetylating mixture of 600 ml. acetic acid plus 110 ml. acetic anhydride plus 3 ml. of concentrated sulfuric acid can be used safely, providing good control to prevent the reaction from going beyond the desired yield and the $SiO_2/MgO$ ratio, even after an hour.

Consequently, dilute acid is preferred and particularly at about 5% solids, a 0.2 normal strength hydrochloric acid solution at atmospheric pressure is about optimum from the point of view of getting the reaction completed in a short time without the danger of too great a loss of product, and without severely detracting from the capability of producing stable aqueous dispersions of it. At higher solids contents the concentration of hydrochloric acid should be adjusted accordingly upwards in order to obtain the desired $SiO_2/MgO$ ratio in the final product.

Following the chemical pretreatment, the modified chrysotile is filtered and, in the case of the preferred treatment, mechanically disintegrated directly in the presence of the retained mother liquor from the digestion treatment using shearing action as, for example, in a Waring Blendor or Osterizer, a Cowles Dissolver, a Rietz Extructor and similar types of mechanical shearing equipment. Of course, if it should be desired, the chemically modified chrysotile may be washed after digestion and filtration but usually we have not found that this step is required. It is of the utmost importance to combine an optimum chemical pretreatment step with the appropriate mechanical disintegration to produce the desired basic microcrystalline colloidal particles of submicron size with the preferred dimensions of these submicron particles being of the order of 150–200 angstroms in diameter and 2000–5000 angstroms in length. Mechanical disintegration of the chemically modified chrysotile is required until such time that at least 10% of the mechanically disintegrated product comprises particles under one micron in all dimensions and preferably comprises 20% or even much more particles having a maximum dimension in all directions of less than a micron. The resultant products will form stable dispersions and gels with water and other polar liquids in concentrations of the order of a few percent.

Prior to the above chemical modifying treatment, the chrysotile may be first opened by subjecting it to mechanical action with or without the presence of dimethyl sulfoxide. Or, as still another route, the acid modified chrysotile is mechanically attrited in the presence of the dimethyl sulfoxide. It has been found that when the asbestos fibers described above are soaked in dimethyl sulfoxide (DMSO) and slurried to permit uniform wetting out of the fibers by the dimethyl sulfoxide, a much more efficient mechanical breakdown of the chrysotile to submicron particles occurs. Dispersion of the slurry with the attendant release of individual fibrils or fibril fragments, respectively, may be aided by treatment of the DMSO slurry in a simple pulping device such as a beater or a Bauer Refiner to provide the appropriate mechanical action desired. After the mechanical treatment, the excess DMSO is separated from the opened-up asbestos as by centrifuge, filter, or squeeze rolls, and asbestos washed free of DMSO.

Although the preferred treatment for soaking or slurrying is to use the DMSO undiluted, dilution with water or any miscible solvent is operable. The DMSO, either undiluted or diluted may be also reused for the steeping and/or slurrying treatments inasmuch as there is no evidence that it is significantly changed chemically during the soaking or slurrying steps.

By using elevated temperatures, the rate of dispersing the fibrils may be enhanced, although operating temperatures of the order of 100 degrees centigrade or less are preferred. Soak or slurry times of about 60 minutes are usually adequate, although much longer times may be desirable in some instances, depending on the natural compactness of the fibril aggregations. Inasmuch as time and temperature are not critical, they can be varied to suit the convenience of the operator.

The microcrystalline colloidal silicate resulting from the above treatment of chrysotile performs many functions. As previously stated, this material is used as a thickening or bodying agent, a gelling agent, a suspending agent, a thixotropic agent, dispersing agent, leveling agent, and in many similar functional applications. It is able to perform one, two, or more functions simultaneously in the same composition due to its unique combination of properties. Because the forces holding the microcrystals together are relatively weak, it is relatively easy to disperse the microcrystalline colloidal silicate in most organic and inorganic media. In other words, the extreme fineness and enormous surface area of the colloidal asbestos is easily put to use. From this very same fineness, large surface and surface characteristics, stem its ability to impart excellent thickening and thixotropic properties to liquids. When dispersed in a liquid system, microcrystalline colloidal silicate forms a net-like structure which entraps the liquid and results in increased viscosity or thickening. Upon agitation or shear, the net structure breaks; when agitation stops, the net reforms. The efficiency of microcrystalline colloidal silicates for imparting apparent viscosity and thickening action appears to be as high or higher than that of other known colloidal products for contributing similar properties.

The viscosity of microcrystalline colloidal silicate gels does not follow the classical relationship with temperature. The viscosity imparted by the colloidal microcrystalline silicate remains quite consistant over a wide temperature range. It has been found, for example, that a 1% solids dispersion of microcrystalline silicates, the product of this invention, in general purpose unsaturated polyester will give a Brookfield viscosity of 4300 centipoises at 25° C. and a Brookfield viscosity of 1700 centipoises at 83° C. with a spindle speed of 10 r.p.m. Thus, colloidal microcrystalline silicate gels may be advantageously used to retard extensive flow of coatings submitted to high temperature curing cycles.

Formulations containing the microcrystalline colloidal silicate do not tend to thin out or "after body" during long-term storage. The viscosity remains unchanged over extensive periods of time. This property is especially important where there is considerable time lapse between the preparation of the coating material and its application.

The microcrystalline colloidal silicate is generally more efficient than many other thickening agents commercially available. It is inherently inexpensive. It is readily dispersed with minimum air entrainment and no agglomeration or lump formation with conventional apparatus. It is inert and compatible with most other materials and may be added to formulations containing other ingredients, such as plasticizers, resins, pigments, and fillers. It is unusually efficient in retarding particle settlement in organic liquids. It improves the brushing characteristics of paints and lacquers and prevents sagging of low viscosity paints, thus enabling preparation of low solids coatings with high viscosity.

The microcrystalline colloidal silicate is an effective thickener, thixotropic agent, dispersing agent, pigment suspending agent, and stabilizer in both acid and alkaline media over a wide pH range. This permits its incorporation into all types of acid and basic compositions such as metal cleaners, oven cleaners, caustic grease cleaners, dry-cell electrolytes, and the like. Little or no syneresis is observed after long storage periods.

The microcrystalline material has good absorbing properties and acts to adsorb materials such as saponified fats.

The liquid medium of the composition of this invention is either aqueous or non-aqueous. Non-aqueous liquid media include liquids of high polarity, e.g., alkanols, diols, polyols, alkylacetates, acetone, methyl ethyl ketone, acetic acid and the like; liquids of medium polarity, e.g., vegetable oils, dialkyl phthalates, organic phosphates, ether-alcohols, polyglycols, liquid alkyd resins, polyurethane resins, epoxy resins, polyester resins, and the like; and non-polar liquids, e.g., benzene, toluene, xylene, hexane, heptane, naphtha, turpentine, mineral spirits, mineral oil, carbon tetrachloride, and the like. The liquid medium may be a mixture of water and a non-aqueous liquid or a mixture of non-aqueous liquids in any desired combination or proportion. In some instances, especially with certain non-polar liquids, it is desirable to incorporate a suitable surfactant to assist in the dispersion step.

While the liquid medium has been described above, the composition also contains a non-aqueous material which is a non-aqueous liquid, for example, as described above, or a finely-divided, dispersible solid material. These solid materials include, for example, thermoplastic and thermosetting resins, hard, brittle natural resins, rubbers, waxes, solid fats, minerals, metals, metal compounds, and the like. The non-aqueous material may be, and often is, a mixture of particulate solid and non-aqueous liquid in any desired combination or proportion. In general, the composition will comprise a major proportion of liquid.

The liquid composition may contain a strong or weak acid, or strong or weak base as a non-aqueous component. For example, alkali metal, alkaline earth metal and ammonium hydroxides and carbonates, as well as hydrochloric acid, sulfuric acid, nitric acid, acetic acid, formic acid, citric acid, lactic acid, benzoic acid, perbenzoic acid, metachlorobenzoic acid, and the like are included.

Additives, to enhance the thickening or thixotropic efficiency of microcrystalline colloidal silicate may be included in the composition of this invention. The type of additive material selected depends on the nature of the liquid composition and the properties desired in the final product. With polar, hydrogen-bonding liquids, additives which are, at times, advantageously employed, are long chain molecules having at only one end a hydrogen-bonding group, for example, polyether-alcohols, quaternary ammonium salts, long chain diamines, and long chain esters. "Bridging" agents are, at times, especially useful with non-polar, non-hydrogen-bonding liquids. These agents include, for example, water, diethylene triamine, glycerol, and ethylene glycol.

The microcrystalline, colloidal silicate is incorporated in the liquid composition of this invention by dispersing it with low, medium or high shear mechanical equipment including, for example, hand stirrers, medium and high speed electrically driven stirrers, homogenizers, mixers, colloid mills, kneaders, roll mills, and grinders. Commercially available high shear equipment includes, for example, the Cowles Dissolver and the Rietz Extructor. The type of equipment will depend on the consistency of the liquid. For example, kneaders and roll mills are most effective with mixes of paste-like consistency. High speed stirrers operate most efficiently with mixes of honey-like consistency. Using the dispersing equipment best suited to the nature of the liquid produces the most economical thickening. The microcrystalline colloidal silicate is generally incorporated in its formulations at room temperature. However, if heat is necessary in certain cases, e.g., wax dispersions, microcrystalline colloidal silicate will, of course, withstand extremely high temperatures. The mixing time varies with the shearing capability of the mixing equipment and the consistency of the mix. It may vary, according to the case, from a few minutes to over an hour.

It is very important to note that the final viscosity of the microcrystalline colloidal silicate dispersions is highly dependent on the method of preparation. By slight adjustment of the preparation variables, such as type of dispersing equipment, time and mixing velocity, it is possible to modify at will some of the properties of a given formulation. Dispersions comprising microcrystalline colloidal silicates possess extreme non-Newtonian properties. As a result, the apparent viscosity of such systems drops very rapidly under conditions involving high speed mixing. On the other hand, of course, the higher the build up of submicron microcrystalline colloidal silicate particles in the composition, in general, the higher the viscosity of the composition at a stationary state.

In the following table, the efficiency of the microcrystalline colloidal silicate (MCS) as a thickening agent in various liquids is compared to a commercially available thickener which is a sub-microscopic pyrogenic silica. Apparent viscosities were obtained using a Brookfield viscometer.

TABLE I

| Liquid | MCS, percent* | Silica, percent* | Viscosity, cps. Spindle Speeds, r.p.m. | | |
|---|---|---|---|---|---|
| | | | .6 | 3.0 | 12.0 |
| Mineral Oil | 1.0 | 0.0 | 66,400 | 18,300 | 5,080 |
| Do | 2.0 | 0.0 | 312,000 | 119,500 | 33,330 |
| Do | 0.0 | 2.0 | 7,000 | 2,150 | 875 |
| Do | 0.0 | 4.0 | 349,000 | 120,000 | 36,700 |
| Ethylene glycol | 2.0 | 0.0 | 99,900 | 33,300 | 10,300 |
| Do | 4.0 | 0.0 | 465,000 | 193,000 | 68,300 |
| Do | 0.0 | 8.0 | 100 | 120 | 100 |
| Do | 0.0 | 15.0 | 300 | 300 | 270 |
| Water | 2.0 | 0.0 | 4,200 | 1,300 | 400 |
| Do | 4.0 | 0.0 | 81,000 | 18,000 | 5,300 |
| Do | 0.0 | 4.0 | 100 | 50 | 30 |
| Do | 0.0 | 8.0 | 700 | 200 | 350 |

*All dispersions were first prepared by stirring with a glass stirring rod driven by a Cenco stirring motor at 1,200 r.p.m. for 30 minutes.

The superior efficiency of the microcrystalline colloidal silicate and thixotropic characteristic of liquid compositions formed therewith are well demonstrated in the above table. Similar results are demonstrated with pigmented coating compositions (paints) in the following table.

TABLE II

| Coating system** | MCS, percent* | Silica, percent* | Viscosity, cps. Spindle speed, r.p.m. | | |
|---|---|---|---|---|---|
| | | | 1.0 | 10 | 100 |
| Chrome oxide green, linseed oil | 0.0 | 0.0 | 56,000 | 7,600 | 1,380 |
| Do | 0.0 | 1.0 | 58,000 | 8,000 | 1,440 |
| Do | 1.0 | 0.0 | 120,000 | 18,400 | 3,400 |
| Red iron oxide, alkyd resin | 0.0 | 0.0 | 2,200 | 420 | 192 |
| Do | 0.0 | 1.0 | 2,800 | 540 | 220 |
| Do | 1.0 | 0.0 | 4,000 | 700 | 264 |

*Based on the binder content of coating.
**Systems prepared by milling in a ball mill until a grind of 6-7 was obtained.

The above data indicates that the microcrystalline colloidal silicate is more effective on a weight basis than the commercially available silica thickener.

The microcrystalline colloidal silicate has similarly demonstrated superior thickening efficiency for water-based paint as compared to commercially available silica thickeners. It has also demonstrated superior anti-settling properties in various paint compositions as compared to a silica dispersing aid and compared to compositions containing no pigment dispersant.

Furthermore, superior thickening efficiency and viscosity improvement has been obtained by incorporating a small amount of microcrystalline colloidal silicate in a commercially available general purpose unsaturated polyester solution (Laminac 4116). This solution was a maleic anhydride - phthalic anhydride - propylene glycol condensation product dissolved in styrene. The thickening properties of microcrystalline colloidal silicate (MCS) were compared with those of Cab-O-Sil EH-5, a sub-microscopic silica, and a resin grade asbestos of Union Carbide Corporation which is a fibrous white chrysotile material having an average diameter of 0.025 micron and length of from several microns up to about 100 microns. These materials are generally used as filler-thickeners. The apparent viscosities at 1.0% solids concentration of the above materials in the polyester solution, and the polyester solution alone, were obtained using a Brookfield Viscometer at various spindle speeds. The dispersions were first prepared by mixing at high speed in a Waring Blendor for 2 minutes. The data are given in the following table.

TABLE III

| Thickener: | Viscosity, cps. Spindle Speed, r.p.m. | | | |
| --- | --- | --- | --- | --- |
| | 0.5 | 2.0 | 20 | 50 |
| None | 800 | 750 | 750 | 750 |
| Asbestos | 1,000 | 900 | 800 | 800 |
| Silica | 10,000 | 4,700 | 1,800 | 1,400 |
| MCS | 31,700 | 11,200 | 2,300 | 1,450 |

The superiority of the microcrystalline colloidal silicate is evident from the above data. No settling occurred with this material, whereas the reverse was true with other thickeners used.

The following examples are set forth to demonstrate some of the compositions of this invention.

EXAMPLE I

The following chrome oxide green-linseed oil paint formulation was milled in a ball mill without adding the microcrystalline colloidal silicate, until a grind of 6–7 was obtained. After the ball milling, the microcrystalline colloidal silicate was dispersed uniformly into the composition using a high speed Cowles Dissolver.

| | Parts (by weight) |
| --- | --- |
| White lead | 519.0 |
| Zinc oxide | 111.0 |
| Chrome oxide green | 111.0 |
| Raw linseed oil | 313.8 |
| Mineral spirits | 26.3 |
| Lead naphthenate (24%) | 6.4 |
| Microcrystalline colloidal silicate (0.3%) | 3.2 |

The following red iron oxide-alkyd resin paint formulation was prepared as described above.

| | Parts (by weight) |
| --- | --- |
| Red iron oxide | 225.0 |
| Zinc yellow | 125.0 |
| Zinc oxide | 25.0 |
| Magnesium silicate | 125.0 |
| Alkyd resin | 198.0 |
| Mineral spirits | 295.0 |
| Lead naphthenate (24%) | 1.1 |
| Cobalt naphthenate (6%) | 0.3 |
| Microcrystalline colloidal silicate (0.2%) | 2.0 |

A water-based flat wall paint formulation was prepared as follows:

The following ingredients were charged to a pony mixer and agitated until a uniform mixture was obtained.

| | Parts (by weight) |
| --- | --- |
| Water | 100.0 |
| Tamol 731 (25%)[1] | 4.5 |
| Acrysol A-3 (25%)[2] | 9.0 |
| Potassium Hydroxide (5%) | 20.0 |
| Antifoamer (Nopco 1497V)[3] | 4.0 |

[1] Sodium salt of carboxylated polyelectrolyte in water.
[2] Polyacrylic acid solution.
[3] Mixture of minor proportion of mineral oil, major proportion of mixed fatty esters with small amount of stearic glycerides, and water.

175 parts by weight of Barytes #1 (Barium sulfate) is rapidly added to the above mixture and allowed to wet thoroughly. 200 parts of titanium dioxide is added at a moderate rate and allowed to wet. 350 parts of calcium carbonate is then added in increments, allowing the paste to wet before more is added. Mixing is continued until a smooth paste is obtained. 30 parts of a 6% solids solution of Acrysol GS (aqueous dispersion of sodium salt of polyacrylic acid) is added followed by 150 parts of water and mixing is continued to a uniform paste. Then, 315 parts of Rhoplex AC-33 (46% aqueous dispersion of thermoplastic acrylic resin) is added followed by 0.6 parts Butrol (solvent solution of 10% phenyl mercuric acetate and 50% potassium o-phenyl phenate) mixed with 15.0 parts of diethylene glycol. The paint is thinned down with 275.0 parts of additional water and 15.9 parts (about 1%) of microcrystalline colloidal silicate is then added. The paint mixture is then mixed until uniform.

A concrete or stucco paint was prepared as described above from the following ingredients:

| | Parts (by weight) |
| --- | --- |
| Rutile titanium dioxide | 280.0 |
| Dibasic lead phosphite | 10.0 |
| Styrene-butadiene resin | 180.0 |
| Chlorinated paraffin | 15.0 |
| Chinawood oil | 5.0 |
| Hi-flash naphtha | 230.0 |
| Mineral spirits | 250.0 |
| Methanol-water (95:5) | 2.0 |
| Microcrystalline colloidal silicate (0.4%) | 4.0 |

The above described paint preparations and others which include microcrystalline colloidal silicate in the formulation have excellent stability and improved coating properties.

An excellent sash putty was prepared by mixing the following ingredients in a Hobart Mixer. The microcrystalline colloidal silicate is dispersed into the mixture as the last step.

| | Parts (by weight) |
| --- | --- |
| Calcium carbonate | 1650.0 |
| Raw linseed oil | 185.0 |
| Mineral spirits | 10.0 |
| Liquid drier | 8.0 |
| Methanol-water (95:5) | 1.3 |
| Microcrystalline colloidal silicate (0.1%) | 2.0 |

A graphite lubricant was prepared by blending the following ingredients in a Cowles Dissolver for 5 minutes.

| | Parts (by weight) |
| --- | --- |
| Microcrystalline colloidal silicate | 4.0 |
| Graphite | 20.0 |
| Water | 76.0 |

This preparation was perfectly stable, whereas a comparable alumina dispersed formulation broke overnight.

EXAMPLE II

A filter coating was prepared by mixing 0.2% by weight of microcrystalline colloidal silicate with tricresyl phosphate in a Waring Blendor. The resulting thickened composition demonstrated a viscosity build-up equal to that obtained by mixing 2.0% by weight of colloid-forming silica gel (Cab-O-Sil) with tricresyl phosphate. This is a ten-fold improvement in thickening ability for microcrystalline colloidal silicate over material conventionally used for this purpose.

The microcrystalline colloidal silicate is, in a like manner, an excellent thickener for organic phosphate esters in general, which, for example, include tributyl phosphate, tributoxyethyl phosphate, trioctyl phosphate, cresyl diphenyl phosphate, and the like.

The following data further illustrate the superior efficiency of microcrystalline colloidal silicate as a thickener for tricresyl phosphates. All dispersions were prepared by mixing for 10 minutes in a Waring Blendor at low speed.

TABLE IV

| | Brookfield viscosity, cps. | | |
| --- | --- | --- | --- |
| | MCS | | Silica *, 1 wt. percent |
| | 0.5 wt. percent | 1.0 wt. percent | |
| Spindle speed, r.p.m.: | | | |
| 0.5 | 23,600 | 39,200 | 100 |
| 1.0 | 17,800 | 32,000 | 110 |
| 2.5 | 11,000 | 13,800 | 108 |
| 10 | 3,740 | 5,400 | 100 |
| 20 | 2,200 | 3,480 | 100 |
| 50 | 1,100 | 2,500 | 107 |

* Cab-O-Sil (M-5).

Effect of temperature on viscosity of tricresyl phosphate thickened with microcrystalline colloidal silicate is shown in the following table. Measurements were made with a Brookfield Viscometer spindle speed of 10 r.p.m.

TABLE V

| Temperature (° C.) | Brookfield viscosity, cps. |
|---|---|
| 25 | 8550 |
| 30 | 8520 |
| 40 | 8200 |
| 50 | 6730 |
| 60 | 6000 |
| 70 | 4550 |
| 80 | 3200 |
| 25 | 8550 |

Liquid compositions containing acid or basic materials also incorporate microcrystalline colloidal silicate to great advantage. Utilitarian compositions such as oven cleaners, grease cleaners, toilet cleaners, paint removers, wood bleaches, and dry-cell battery electrolytes, are easily thickened to a stable consistency with small amounts of the microcrystalline colloidal silicate. Other substances such as starch, clays, gums, colloidal alumina and similar products either break down under extreme pH conditions or fail to provide stability for a reasonable amount of time.

Paste-like cleaning or treating compositions containing microcrystalline colloidal silicate are easily and effectively applied by brush, aerosol spray, or with squeeze applicator and the like. The composition will remain on vertical or under horizontal surfaces without running or dripping, and is easily removed, for example, with a paper towel or sponge.

Various examples of acid and basic compositions of this invention are set forth below.

EXAMPLE III

Microcrystalline colloidal silicate (2.43 g.) is mixed with water (64.48 g.) in a Cowles Dissolver for 2 minutes. Silica (16.14 g.), concentrated hydrochloric acid (10.9 g.) and citric acid (6.05 g.) are then added and mixed for an additional 10 minutes. The resulting acid cleaner paste is stable and can be stored for long periods of time without undergoing any change in properties.

Sodium hydroxide (8.0 g.) is dissolved in water (6.25 g.) and added to microcrystalline colloidal silicate (3.25 g.) which has already been mixed with water (77.0 g.). The mass is then placed in a Cowles Dissolver and mixed at 2900 r.p.m. for several minutes. Then, glycerin (2.00 g.), rutile (2.0 g.) and an ionic surfactant (1.5 g.) are added and the batch mixed for 10 minutes. A smooth cream, useful as an oven cleaner, is produced with no signs of separation.

In alkaline preparations, such as above, where a small amount of the microcrystalline colloidal silicate is employed, a few percent of glycerin or ethylene glycol is used to eliminate the slippery feeling caused by the caustic, afford some protection to skin and help prevent slight surface syneresis or weeping. Whitening agents, other than titanium dioxide may also be used including carbonates, talc and other inorganic compounds. Any salts may be used as incompatibility is unknown. Silica and other abrasives such as Carborundum, rouge and the like are useful ingredients, as well as ionic and non-ionic surfactants.

The microcrystalline colloidal silicate is advantageously employed as a dispersant and stabilizer in acid or base catalyzed aqueous emulsion polymerization procedures whereby stable, thixotropic resin latices are readily prepared.

EXAMPLE IV

A thickened salt solution was prepared as follows: An 8% aqueous paste of microcrystalline colloidal silicate was mixed with a 50% aqueous solution of zinc chloride at a mix ratio of 40 to 20 parts, respectively. 40 parts by weight of solid zinc chloride was added to this and the mixture was stirred until the salt was dissolved. The solution was allowed to set. Brookfield viscosities at 5.0 r.p.m. for this solution and a comparable formulation thickened with commercially available colloidal alumina were 48,000 and 32,200 cps., respectively.

A chrome plating paste was prepared in a manner similar to the above salt solution, and consisted of the following formulation:

| | G. |
|---|---|
| Microcrystalline colloidal silicate | 3.0 |
| Chromic acid | 20.0 |
| Sulfuric acid (Conc.) | 2.0 |
| Water | 75.0 |

A dry cell electrolyte solution (Le Clanché type) was prepared as above with the following formula:

| | G. |
|---|---|
| Microcrystalline colloidal silicate | 4.0 |
| Ammonium chloride | 20.0 |
| Zinc chloride | 2.0 |
| Glycerin | 2.0 |
| Water | 72.0 |

The above thickened compositions exhibit improved stability.

A thickened salt solution that might be used as a herbicidal spray for defoliant action and similar types of applications, was prepared as follows: 1.6% of microcrystalline colloidal silicate was dispersed in $MgCl_2$ solution based on a concentration of 3.5 lbs. $MgCl_2 \cdot 6H_2O$/gallon of water. This was dispersed in a Waring Blendor and gave a very smooth, homogeneous and very stable dispersion. No settling was observed after a period of several days. An apparent Brookfield viscosity at 20 r.p.m. using a number 3 spindle at 25° C. was found to be 1600 centipoises. The microcrystalline colloidal silicate stabilized $MgCl_2$ dispersions, giving a much higher viscosity than was found when other thickening agents were used such as colloidal silicas and sodium carboxymethyl cellulose. In view of the inherent low cost of microcrystalline colloidal silicates, their price-performance ratio over much more expensive organic thickening agents makes them especially suitable for this type of application.

Wax emulsions, which do not incorporate surface active agents or emulsifiers having a tendency to reduce the desirable physical properties of the wax, may also be prepared with small amounts of microcrystalline colloidal silicate. Any normally solid or semi-solid wax or wax-like material may be used for this purpose.

Generally, the wax emulsion is prepared in any convenient manner. For example, an aqueous dispersion of microcrystalline colloidal silicate is heated to 80–100° C., agitated or stirred and molten wax added to the aqueous dispersion. An emulsion of small globules of molten wax in a continuous aqueous medium is formed by the shearing force of the mixer. The mixture is permitted to cool, with or without agitation, so that at the melting point of the wax, liquid spheres present in the dispersion solidify to form a stable emulsion containing solid wax particles.

The oil-in-water emulsion is also formed by an inversion technique wherein a heated aqueous dispersion of microcrystalline colloidal silicate is added to the molten wax until the water-in-oil mixture changes to oil-in-water.

Where the wax is high boiling, such as found in certain synthetic waxes, it may be dissolved in a low boiling organic solvent and the solution mixed with an aqueous dispersion of microcrystalline colloidal silicate. When thoroughly mixed, the solvent is boiled off, to leave a stable wax emulsion.

The foregoing disclosure is exemplary and shows only a few of the uses to which the liquid composition of this invention may be put.

I claim:

1. A composition of matter comprising a major proportion of a liquid medium that includes a non-aqueous constituent and a minor proportion, but not less than about 0.1% based on the weight of the liquid medium of a disintegrated chemically modified chrysotile colloidally dispersed in the liquid medium, at least about 10% by weight of the disintegrated, modified chrysotile having a particle size not exceeding one micron, the chemically modified chrysotile having a $SiO_2$ to $MgO$ weight ratio of from about 5% to about 30% greater than the corresponding ratio of the parent chrysotile.

2. The composition of claim 1 containing from about 0.1 to about 10% of the modified chrysotile.

3. The composition of claim 1 wherein the liquid medium contains water.

4. The composition of claim 1 wherein the non-aqueous constituent is acidic.

5. The composition of claim 1 wherein the non-aqueous constituent is basic.

6. The composition of claim 1 wherein the liquid medium is a paint.

7. The composition of claim 1 wherein the non-aqueous constituent is a liquid organic phosphate ester.

8. The composition of claim 1 wherein the non-aqueous constituent is a resin.

9. The composition of claim 1 wherein the non-aqueous constituent is an unsaturated polyester resin.

10. The composition of claim 1 wherein the non-aqueous constituent is a wax.

11. The composition of claim 1 wherein the liquid medium is non-aqueous.

12. The composition of claim 1 which is a flowable paste.

References Cited

UNITED STATES PATENTS

| | | | |
|---|---|---|---|
| 130,663 | 8/1872 | Rosenthal | 162—3 |
| 505,916 | 10/1893 | Hoffman | 106—272 |
| 939,982 | 11/1909 | Conboy | 106—272 |
| 1,340,535 | 5/1920 | Garcin | 162—3 |
| 2,482,086 | 9/1949 | Foster | 260—40 |
| 2.631,137 | 3/1953 | Loritsch et al. | 260—40 |
| 3,077,424 | 2/1963 | Maker et al. | 260—40 |
| 3,131,148 | 4/1964 | Taulli | 260—40 |
| 3,324,663 | 6/1967 | McLean | 260—40 |
| 3,354,114 | 11/1967 | Doyle | 260—40 |

FOREIGN PATENTS

| | | | |
|---|---|---|---|
| 13,412 | 5/1928 | Australia | 162—153 |
| 562,161 | 6/1944 | Great Britain | 260—37 |

MORRIS LIEBMAN, Primary Examiner

P. R. MICHL, Assistant Examiner

U.S. Cl. X.R.
260—28.5, 37, 40

UNITED STATES PATENT OFFICE
CERTIFICATE OF CORRECTION

Patent No. 3,547,669              Dated December 15, 1970

Inventor(s)   Orlando A. Battista

It is certified that error appears in the above-identified patent and that said Letters Patent are hereby corrected as shown below:

Col. 1, line 39, cancel the comma (,) after "lubricatin Col. 7, line 5, Table III, the word "Thickener" should be moved up to appear as a title; line 32, "(0.3%)" should be moved to the right beside "3.2"; line 45, "(0.2%)" should be moved to the right beside "2.0"; Col line 15, "(0.4%)" should be moved to the right beside "4.0"; line 31, "(0.1%)" should be moved to the right beside "2.0"; line 69, Table IV, the words "Spindle speed, r.p.m." should be moved up a line so as to appea as a title; Col. 9, line 15, delete the whole line; line 29, "slicate" should read "silicate"; Col. 10, line 68, change the period (.) after "waxes" to a comma (,); line 71, change the period (.) after "mixed" to a comma (,); and delete the period (.) after "off".

Signed and sealed this 30th day of March 1971.

(SEAL)
Attest:

EDWARD M. FLETCHER, JR.           WILLIAM E. SCHUYLER,
Attesting Officer                  Commissioner of Paten

FORM PO-1050 (10-69)